United States Patent
Leeker et al.

(10) Patent No.: US 10,232,984 B2
(45) Date of Patent: Mar. 19, 2019

(54) RECLOSABLE PACKAGING WITH A HANDLE, AND METHODS AND DEVICES FOR MAKING SUCH PACKAGING

(71) Applicant: Nestec SA, Vevey (CH)

(72) Inventors: Russell A. Leeker, Fenton, MO (US); Erica Canavesi, Ribeirao Preto-SP (BR)

(73) Assignee: Nestec SA, Vevey (CH)

( * ) Notice: Subject to any disclaimer, the term of this patent is extended or adjusted under 35 U.S.C. 154(b) by 0 days.

(21) Appl. No.: 14/803,614

(22) Filed: Jul. 20, 2015

(65) Prior Publication Data

US 2016/0023809 A1 Jan. 28, 2016

Related U.S. Application Data

(60) Provisional application No. 62/027,430, filed on Jul. 22, 2014.

(51) Int. Cl.
*B65D 33/18* (2006.01)
*B23K 26/38* (2014.01)
(Continued)

(52) U.S. Cl.
CPC .............. *B65D 33/18* (2013.01); *B23K 26/38* (2013.01); *B23K 26/402* (2013.01);
(Continued)

(58) Field of Classification Search
CPC .... B65D 75/5866; B65D 33/08; B65D 33/18; B65D 75/566; B65D 75/5816
(Continued)

(56) References Cited

U.S. PATENT DOCUMENTS

| | | | | |
|---|---|---|---|---|
| 5,437,406 A | * | 8/1995 | Gordon | B31B 1/26 |
| | | | | 229/104 |
| 5,941,643 A | * | 8/1999 | Linkiewicz | B65B 9/20 |
| | | | | 383/210 |

(Continued)

FOREIGN PATENT DOCUMENTS

| | | | | |
|---|---|---|---|---|
| DE | 20115181 U1 | * | 1/2002 | ............. B65D 30/20 |
| EP | 0370957 A1 | * | 5/1990 | |

(Continued)

OTHER PUBLICATIONS

Machine translation of description of WO 2007147568 A1.*

(Continued)

*Primary Examiner* — Jes F Pascua
(74) *Attorney, Agent, or Firm* — Ronald A. Burchett; Julie M. Lappin (57) ABSTRACT

A reclosable pour-spout packaging, such as a bag, has a top handle and can be manufactured on a form-fill-seal machine. A reclosable structure can reversibly close and open the interior of the packaging. The handle can comprise a cut extending through the packaging. An additional seal area in the packaging can provide support so that a punch and die assembly can punch or cut the handle in the additional seal area. Additionally or alternatively, a laser device, a blade, a knife, or another cutting tool can form the handle in the additional seal area. The additional sealed area can provide stiffness for carrying the packaging and also prevent access into the packaging where the handle is made. The additional seal area can be positioned below the top seal of the packaging so that less material is used for the handle.

8 Claims, 6 Drawing Sheets

(51) Int. Cl.
  *B23K 26/402* (2014.01)
  *B65B 9/20* (2012.01)
  *B65B 61/16* (2006.01)
  *B65D 33/08* (2006.01)
  *B65D 75/58* (2006.01)
  *B65D 75/56* (2006.01)
  *B23K 103/00* (2006.01)
  *B65B 51/06* (2006.01)
  *B65B 51/26* (2006.01)
  *B65B 61/18* (2006.01)

(52) U.S. Cl.
  CPC ............ *B65B 9/2056* (2013.01); *B65B 61/16* (2013.01); *B65D 33/08* (2013.01); *B65D 75/566* (2013.01); *B65D 75/5816* (2013.01); *B65D 75/5866* (2013.01); *B23K 2103/42* (2018.08); *B65B 51/06* (2013.01); *B65B 51/26* (2013.01); *B65B 61/188* (2013.01); *B65B 2220/12* (2013.01); *B65D 2575/586* (2013.01)

(58) Field of Classification Search
  USPC ............................ 383/10, 906, 203, 204, 120
  See application file for complete search history.

(56) References Cited

U.S. PATENT DOCUMENTS

| 6,053,635 | A | * | 4/2000 | Anderson | B31B 19/86 |
| | | | | | 383/10 |
| 6,206,571 | B1 | | 3/2001 | Olin | |
| 6,481,183 | B1 | | 11/2002 | Schmidt | |
| 6,534,572 | B1 | | 3/2003 | Ahmed et al. | |
| 6,957,915 | B2 | * | 10/2005 | Tankersley | B65B 9/20 |
| | | | | | 383/10 |
| 8,007,174 | B2 | * | 8/2011 | Yamaguchi | A61J 1/10 |
| | | | | | 383/104 |
| 8,430,566 | B2 | * | 4/2013 | Brauer | B65D 33/08 |
| | | | | | 383/109 |
| 8,690,428 | B2 | * | 4/2014 | Kruse | B65D 31/10 |
| | | | | | 383/10 |
| 2003/0077006 | A1 | | 4/2003 | Seigel | |
| 2003/0100424 | A1 | * | 5/2003 | Barmore | B65B 61/188 |
| | | | | | 493/394 |
| 2006/0034551 | A1 | * | 2/2006 | Linneweil | B65D 31/10 |
| | | | | | 383/61.2 |
| 2006/0094581 | A1 | | 5/2006 | Jackson | |
| 2006/0210199 | A1 | * | 9/2006 | Ali | B65D 33/14 |
| | | | | | 383/10 |
| 2007/0230834 | A1 | * | 10/2007 | Schneider | B65D 75/5805 |
| | | | | | 383/64 |
| 2009/0180716 | A1 | * | 7/2009 | Steele | B65D 75/56 |
| | | | | | 383/26 |
| 2010/0124386 | A1 | | 5/2010 | Sturgis | |
| 2012/0195532 | A1 | * | 8/2012 | Koesters | B65D 31/10 |
| | | | | | 383/120 |
| 2016/0137378 | A1 | * | 5/2016 | Kruse | B31B 37/00 |
| | | | | | 383/25 |

FOREIGN PATENT DOCUMENTS

| EP | 1595815 | A1 | | 11/2005 | | |
| EP | 1873081 | A1 | * | 1/2008 | ............ | B31B 19/36 |
| JP | 2008201462 | A | * | 9/2008 | | |
| JP | 2010023921 | A | * | 2/2010 | | |
| WO | 2002090200 | A2 | | 11/2002 | | |
| WO | 2003082692 | A1 | | 10/2003 | | |
| WO | WO 2007147568 | A1 | * | 12/2007 | ............ | B65D 31/10 |
| WO | 2010051146 | A2 | | 5/2010 | | |

OTHER PUBLICATIONS

Machine translation of description of EP 1873081 A1.*
Machine translation of description of DE 20115181 U1.*
Machine translation of the description of JP 2008201462 A.*
Machine translation of the description of JP 2010023921 A.*
International Search Report and Written Opinion, PCT/IB2015/055499, dated Jan. 24, 2017.

* cited by examiner

RECLOSABLE PACKAGING WITH A HANDLE, AND METHODS AND DEVICES FOR MAKING SUCH PACKAGING

CROSS REFERENCE TO RELATED APPLICATIONS

This application claims priority to U.S. Provisional Application No. 62/027,430 filed Jul. 22, 2014, the disclosure of which is incorporated herein by this reference.

BACKGROUND

The present disclosure relates generally to reclosable pour-spout packaging that has a top handle. The packaging can be made by a form, fill and seal machine.

Form, fill and seal machines are commonly known in the packaging industry. Form, fill and seal machines are generally made of numerous components that perform separate steps of forming, filling and sealing containers with a suitable product such as a food or medical product. Typically, the machine transforms a roll of film into a flexible container. The machine fills the flexible container with the food or medical product and seals the container.

Although packaging made by form, fill and seal machines is easily produced, such packaging is not necessarily easily used to dispense product from the packaging. The existing solution is to apply a handle to the side gusset of the package, for example using adhesive.

SUMMARY

The present disclosure relates to a reclosable pour-spout packaging with a top handle that can be manufactured on a form-fill-seal machine. The handle can be formed by cutting the packaging adjacent to the reclosable structure. To the best knowledge of the present inventors, a reclosable pour-spout packaging that is manufactured on a form-fill-seal machine and has a top handle does not exist.

Accordingly, in a general embodiment, the present disclosure provides a packaging comprising: an interior comprising an upper end defined by a first seal and a lower end defined by a second seal; a handle positioned below the first seal and comprising a cut in the packaging; and a reclosable seal positioned below the first seal, configured to reversibly open and close the interior, and at least partially horizontally positioned.

In an embodiment, the packaging comprises a third seal that is horizontally aligned with the reclosable seal. The handle can extend through the third seal. The first, second and third seals can be horizontal. The packaging can comprise a fourth seal below the first seal and above the third seal, and the handle can extend through the fourth seal.

In an embodiment, the cut is a slit such that the packaging comprises a flap.

In an embodiment, the cut is a cut-out hole such that material is absent between two adjacent portions of the packaging.

In an embodiment, the packaging is a bag.

In another embodiment, the present disclosure provides a method for making a packaging. The method comprises: forming a handle in a bag, the handle comprises a cut in the bag; and applying a horizontal reclosable seal to the bag.

In an embodiment, the method comprises making the bag from a film using a form-fill-seal machine. The film can comprise an opening before the film is processed by the form-fill-seal machine, and the horizontal reclosable seal applied by the form-fill-seal machine can reversibly open and close the opening.

In an embodiment, the method comprises using a laser or cutting tool to create an opening in the bag, and the horizontal reclosable seal reversibly opens and closes the opening.

In an embodiment, the method comprises forming a sealed area, the bag comprises a top seal above the sealed area, and the handle is formed in the bag so that the cut extends through the sealed area. The forming of the sealed area can comprise using heat to fuse a portion of a front panel of the bag to a portion of a back panel of the bag. The sealed area and the horizontal reclosable seal can be formed in horizontal alignment with each other. The sealed area and the horizontal reclosable seal can be formed such that the sealed area is positioned above the horizontal reclosable seal.

In an embodiment, the method comprises dispensing a food product into the bag before the forming of the handle and the applying of the horizontal reclosable seal.

In an embodiment, the method comprises using a device selected from the group consisting of a punch and die assembly, a laser device, and a cutting tool to form the handle.

In another embodiment, the present disclosure provides a machine for making a packaging. The machine comprises: a hollow forming tube; a vertical sealing bar configured to form a sealed lateral edge of the packaging; a horizontal sealing bar configured to form first and second seals in the packaging; an additional horizontal sealing bar configured to form a third seal in the packaging; a device configured to form a handle comprising a hole through the third seal; and an applicator configured to apply a reclosable seal to the packaging.

In an embodiment, the device configured to form a handle is selected from the group consisting of (i) a punch and die assembly and (ii) a laser device.

An advantage of the present disclosure is to eliminate the need for additional material to cut a top handle in a bag made by a form-fill-seal machine and having a reclosable spout.

A further advantage of the present disclosure is to reduce cost and material for a handle in a bag made by a form-fill-seal machine and having a reclosable spout.

Still another advantage of the present disclosure is to provide a handle in a form-fill-seal bag without applying a handle to the side gusset of the bag; a handle applied to the side gusset of the bag is difficult to see when the bag is sitting on store shelf, adds cost to the bag, and impacts sustainability due to extra materials such as adhesive and the material of the handle.

Yet another advantage of the present disclosure is that, when the form-fill-seal bag is cut to be opened, the handle stays in the bag and can still be used until the end of the product.

A further advantage of the present disclosure is to allow the consumer to easily visually locate the handle on the form-fill-seal package for carrying.

Still another advantage of the present disclosure is to reduce tearing propagation of the handle in a bag made by a form-fill-seal machine.

Yet another advantage of the present disclosure is to improve manufacturability of a form-fill-seal bag with a handle and a reclosable pour spout.

Another advantage of the present disclosure is to seal a bag at the top, create another sealed area, and punch or cut a handle in the other sealed area all in one operation.

A further advantage of the present disclosure is to form an additional seal area in a form-fill-seal bag such that the additional seal area provides support so that a die punch can punch or cut a handle, provides stiffness for carrying the bag, and prevents access into the bag where the handle is made.

Additional features and advantages are described herein and will be apparent from the following Figures and Detailed Description.

DETAILED DESCRIPTION

As used in this disclosure and the appended claims, the singular forms "a," "an" and "the" include plural referents unless the context clearly dictates otherwise. The words "comprise," "comprises" and "comprising" are to be interpreted inclusively rather than exclusively. Likewise, the terms "include," "including" and "or" should all be construed to be inclusive, unless such a construction is clearly prohibited from the context. However, the products, methods and devices disclosed herein may lack any element that is not specifically disclosed. Thus, a disclosure of an embodiment using the term "comprising" includes a disclosure of embodiments "consisting essentially of" and "consisting of" the components identified.

The terms "food," "food product" and "food composition" mean a product or composition that is intended for ingestion by an animal, including a human, and provides at least one nutrient to the animal. The present disclosure is not limited to a specific animal. The term "pet" means any animal which could benefit from or enjoy the food compositions and products that can be provided by packaging according to the present disclosure. The pet can be an avian, bovine, canine, equine, feline, hicrine, lupine, murine, ovine, or porcine animal. The pet can be any suitable animal. The term "companion animal" means a dog or a cat.

The term "pet food" means any composition formulated to be consumed by a pet. "Dry food" is pet food having a water activity less than 0.65. "Semi-moist food" and "intermediate moisture food" is pet food having a water activity from 0.65 to 0.8. "Wet food" is pet food having a water activity more than 0.8. "Shelf-stable" means stable at ordinary temperatures for at least one year.

"Kibbles" are pieces of dry pet food which can have a pellet shape or any other shape. Non-limiting examples of kibbles include particulates; pellets; pieces of pet food, dehydrated meat, meat analog, vegetables, and combinations thereof; and pet snacks, such as meat or vegetable jerky, rawhide, and biscuits. The present disclosure is not limited to a specific form of the kibbles.

Ranges are used herein in shorthand to avoid listing every value within the range. Any appropriate value within the range can be selected as the upper value or lower value of the range. Moreover, the numerical ranges herein include all integers, whole or fractions, within the range.

All percentages expressed herein are by weight of the total weight of the food composition unless expressed otherwise. When reference is made to the pH, values correspond to pH measured at 25° C. with standard equipment. As used herein, "about" or "substantially" in reference to a number, such as an angle or a relative position, is understood to refer to numbers in a range of numerals, for example the range of −10% to +10%, preferably −5% to +5%, more preferably −1% to +1%, and even more preferably −0.1% to +0.1% of the referenced number.

The methods and compositions and other advances disclosed herein are not limited to particular methodologies, protocols, and reagents because, as the skilled artisan will appreciate, they may vary. Further, the terminology used herein is for the purpose of describing particular embodiments only and does not limit the scope of that which is disclosed or claimed.

Unless defined otherwise, all technical and scientific terms, terms of art, and acronyms used herein have the meanings commonly understood by one of ordinary skill in the art in the field(s) of the present disclosure or in the field(s) where the term is used. Although any compositions, methods, articles of manufacture, or other means or materials similar or equivalent to those described herein can be used, the preferred compositions, methods, articles of manufacture, or other means or materials are described herein.

The present disclosure provides a packaging 10, embodiments of which are generally illustrated in FIGS. 1A, 1B, 2 and 3. The packaging 10 is preferably a flexible container such as a bag. In an embodiment, the packaging 10 has an interior that contains a product 50 such as non-consumable products; human food; or pet food, such as companion animal food, for example cat food, dog food, and the like, preferably shelf-stable dry pet food e.g. kibbles. The packaging 10 can have a variety of sizes, capacities and shapes. In an embodiment, the packaging 10 is substantially rectangular. In an embodiment, the packaging 10 can comprise gussets, although in another embodiment the packaging 10 does not have gussets. The packaging 10 is not limited to the absence or presence of gussets.

The packaging 10 can be made of any material, such as thermoplastic material. For example, the packaging 10 can be made of polywoven material which can comprise polyester, polypropylene, polyethylene, or combinations thereof, and the polywoven material can optionally reside on a paper layer. The packaging 10 is not limited to a specific embodiment of the material that forms the packaging 10.

The packaging 10 comprises a first seal 11, preferably at the uppermost end of the packaging 10, and further comprises a second seal 12, preferably at the bottommost end of the packaging 10. In an embodiment, at least one of the first and second seals 11,12 is horizontal, preferably both. "Horizontal" refers to the orientation of the referenced component when the packaging 10 is resting on the end of the packaging 10 that comprises the second seal 12. For example, "horizontal" components of the packaging 10 can be substantially parallel to the end of the packaging 10 that comprises the second seal 12. Each component of the packaging 10 that is described as "horizontal" is substantially parallel to the other components of the packaging 10 described as "horizontal."

The interior of the packaging 10 can be at least partially defined by a first lateral edge 21, a second lateral edge 31, and the first and second seals 11,12. The first and second lateral edges 21,31 can be substantially perpendicular to the first seal 11 and/or the second seal 12. Preferably one or both of the first and second seals 11,12 extend from the first lateral edge 21 to the second lateral edge 31 to thereby extend across the entire width of the packaging 10. The packaging 10 can further comprise a third seal 13 which can be horizontal. Preferably the third seal 13 is below the first seal 11 and above the second seal 12.

Each of the first, second and third seals 11-13 can be made using any process for sealing a bag known to one of ordinary skill in this art. For example, one or more of the first, second and third seals 11-13 can be made by hot air heat sealing. As another example, one or more of the first, second and third seals 11-13 can be made by pinch heat sealing. In such embodiments, the corresponding one or more seals may comprise a portion of the front panel of the packaging 10 that is fused to a portion of the back panel of the packaging 10. As yet another example, one or more of the first, second and third seals 11-13 can comprise adhesive. The packaging 10 is not limited to a specific embodiment of the first, second and third seals 11-13.

The packaging 10 comprises a handle 20 that comprises a cut that extends through the packaging 10, for example from the front panel of the packaging 10 to the back panel of the packaging 10. As used herein, a "cut" is a section of the packaging 10 in which a portion of the packaging 10 has been partially disconnected from the adjacent portion of the packaging 10. A cut can be made without removing material from the packaging 10, for example by a laser device, a blade, a knife, or another cutting tool, or made by removing material from the packaging 10, for example by a punch and die assembly.

Figure 6:
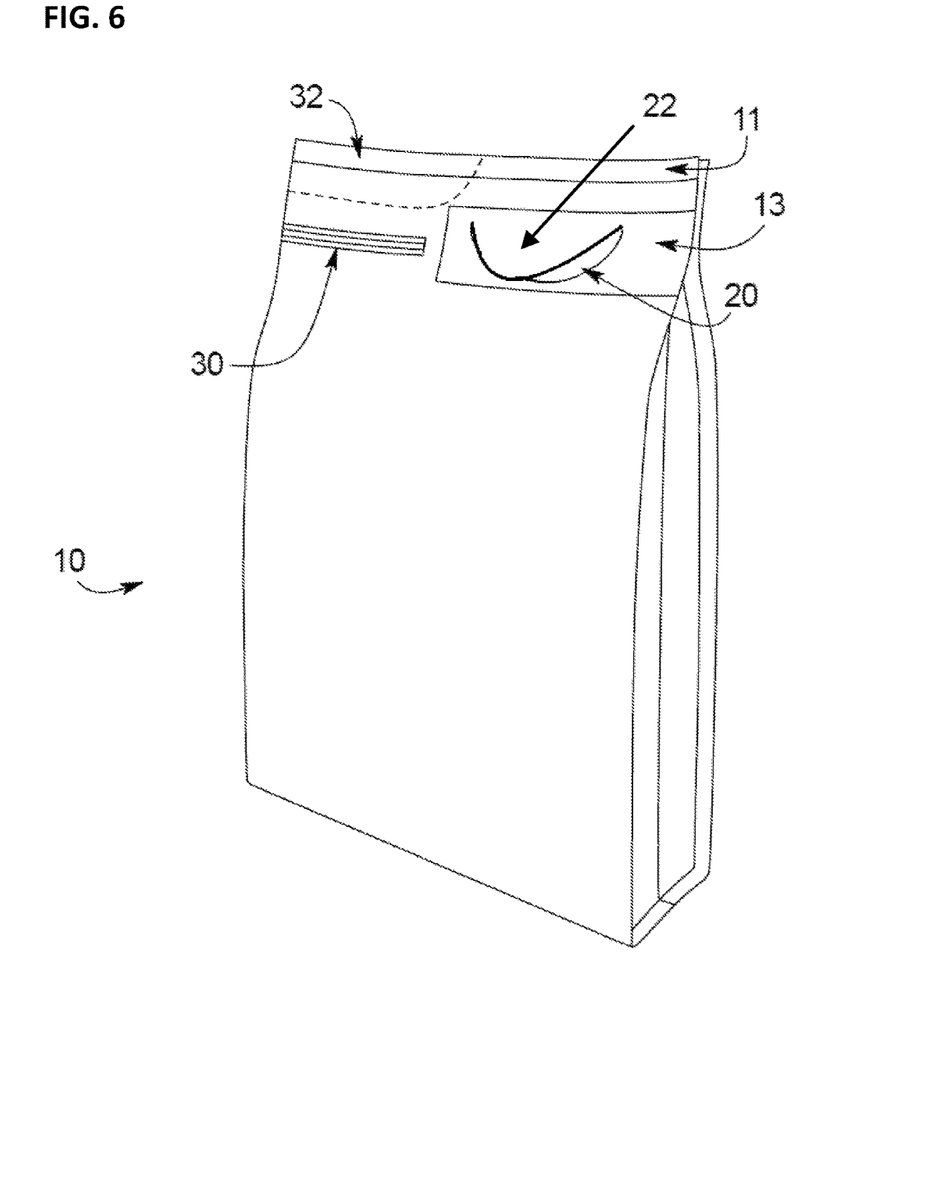
FIG. 6 shows a perspective view of an embodiment of packaging provided by the present disclosure.

In an embodiment, particularly applicable to an embodiment of the packaging 10 in which the packaging 10 is formed by a form-fill-seal machine, the handle 20 comprises a slit formed without removing material from the packaging 10. For example, as shown in FIG. 6, part of the packaging 10 can form a flap 22 that can be moved away from the slit, and one or more fingers can be inserted through the slit. The slit can be formed by a laser device, a blade, a knife, or another appropriate device. The slit can have a shape that is waved, for example a horizontal S; a horizontal straight line; a semi-circle; or any other shape that will allow one or more fingers therethrough. The slit is not limited to a specific shape, and the slit can have any shape.

In another embodiment, particularly applicable to an embodiment of the packaging 10 in which the packaging 10 is formed from a pre-made bag, the handle 20 can be a cut-out hole in which a portion of the material of the packaging 10 is removed. For example, the handle 20 can be a section of the packaging 10 in which a cut-out hole is formed by a punch and a die assembly. The cut-out hole can have a shape that is a semi-circle, a rectangle, an oval, or any other shape that will allow one or more fingers therethrough. The cut-out hole is not limited to a specific shape, and the cut-out hole can have any shape.

Figure 1A:
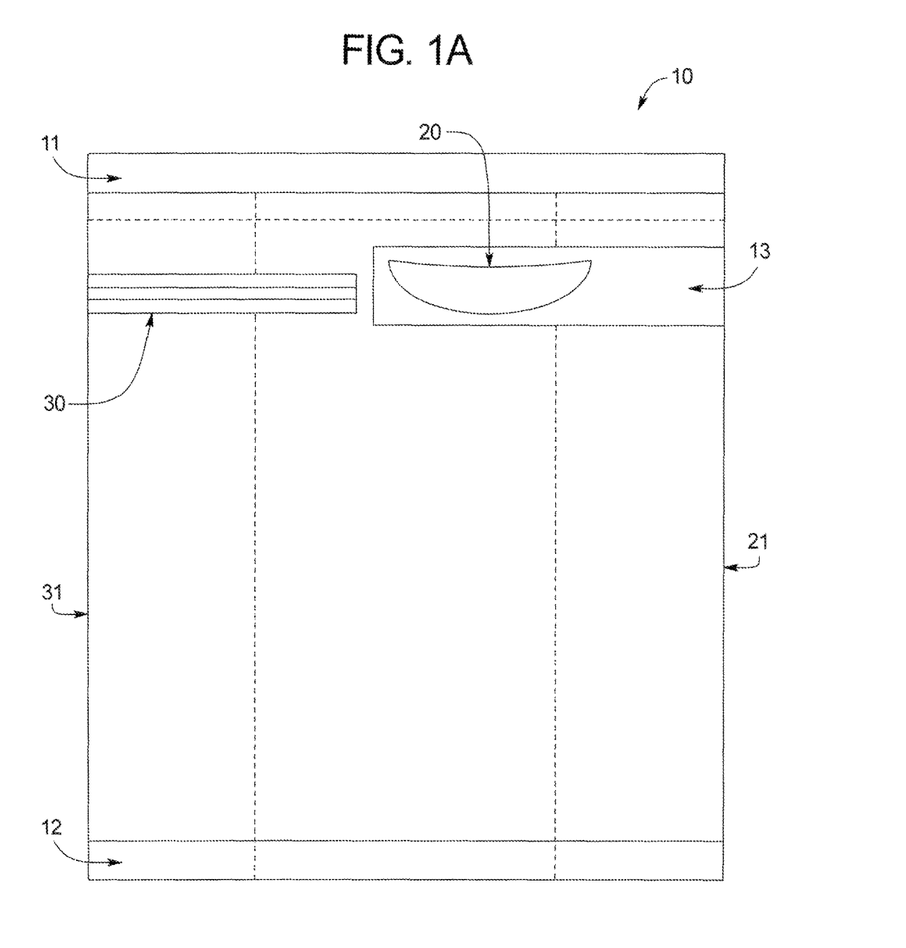
FIG. 1A shows a plan view of an embodiment of packaging provided by the present disclosure, from a side of the packaging that is the front or the back of the packaging.

As generally shown in FIG. 1A, the handle 20 can be a cut formed in and/or extending through the third seal 13. In an embodiment, the entirety of the cut is positioned within the perimeter of the third seal 13. The cut can be a slit in the third seal 13 formed by a laser device, a blade, a knife, or another appropriate device and/or can be a cut-out hole in the third seal 13 formed by a punch and die assembly.

Figure 1B:
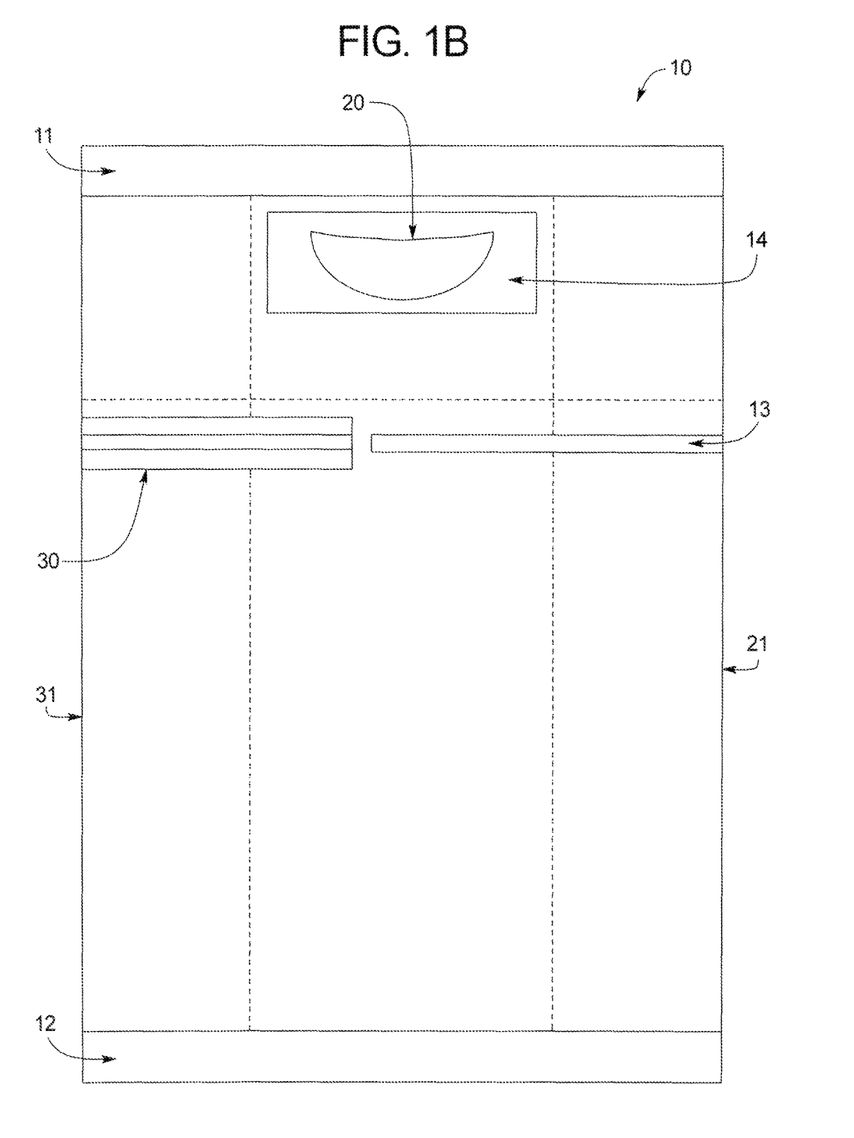
FIG. 1B shows a plan view of another embodiment of packaging provided by the present disclosure, from a side of the packaging that is the front or the back of the packaging.
Figure 2:
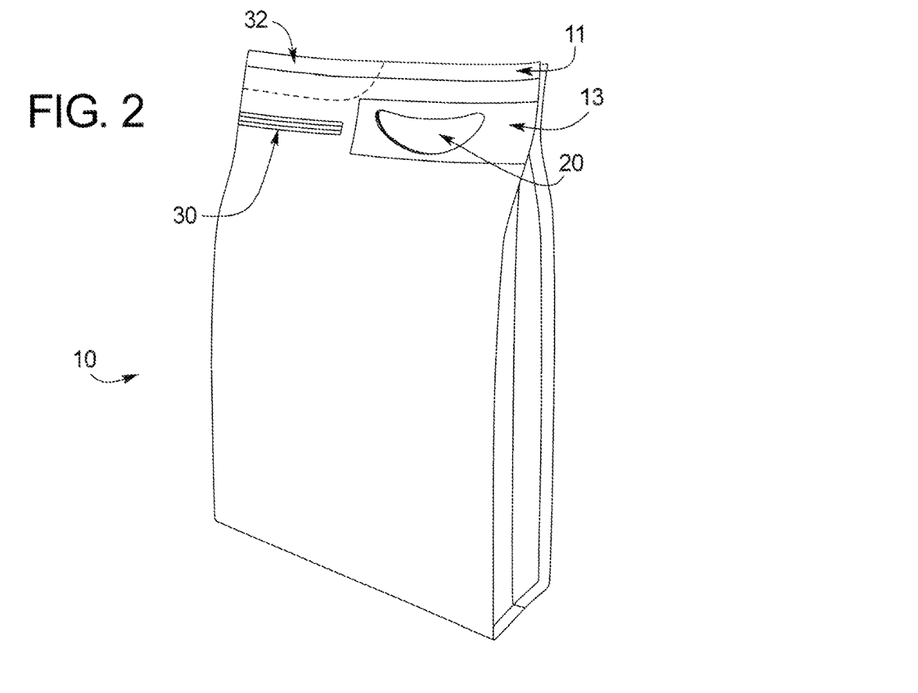
FIGS. 2 and 3 show perspective views of an embodiment of packaging provided by the present disclosure.
Figure 3:
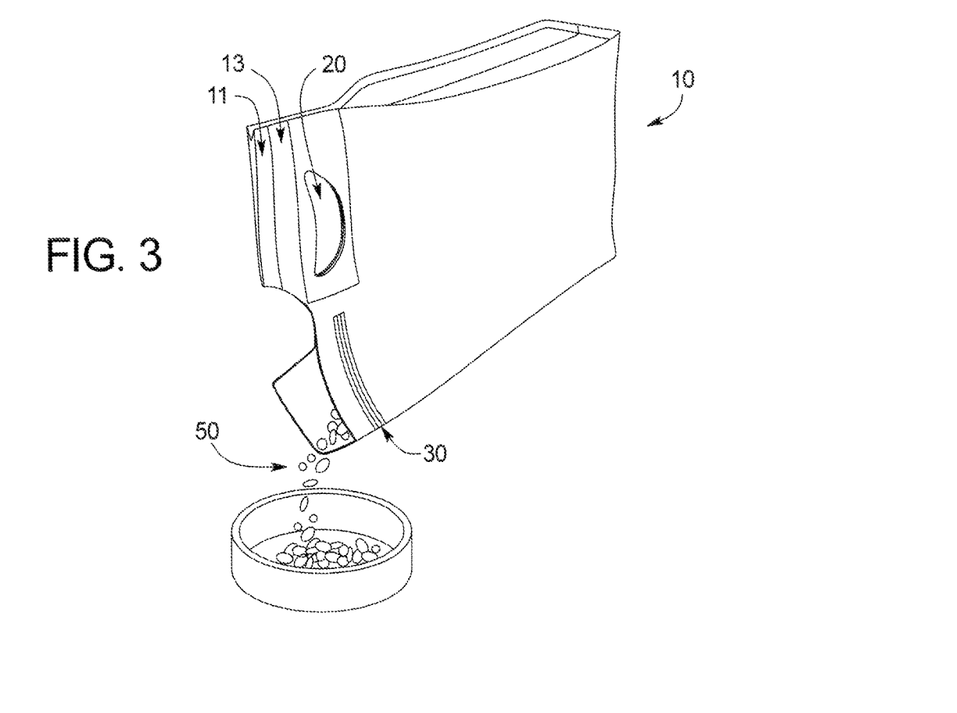

As generally shown in FIG. 1B, the handle 20 can be a cut positioned above the third seal 13. In an embodiment, the cut can be positioned within a fourth seal 14; preferably the entirety of the cut is positioned within the perimeter of the fourth seal 14. The cut can be a slit in the fourth seal 14 formed by a laser device, a blade, a knife, or another appropriate device and/or can be a cut-out hole in the fourth seal 14 formed by a punch and die assembly. The fourth seal 14 can be made similarly to the first, second and third seals 11-13 or can be formed differently.

Preferably the handle 20 is configured so that an individual can extend at least a portion of a hand through the handle 20 to carry the packaging 10. In an embodiment, the horizontal length of the handle 20 is a greater distance than the vertical height of the handle 20. Preferably the handle 20 is proximate to the first seal 11 such that an individual can extend four fingers through the handle 20 while extending a thumb over the first seal 11 to the other side of the packaging 10 to thereby grasp the packaging 10 with an at least partially closed hand.

As generally shown in FIG. 1B, the handle 20 can be centered in the packaging 10. For example, the distance from the handle 20 to the first lateral edge 21 can be substantially the same as the distance from the handle 20 to the second lateral edge 31. As generally shown in FIG. 1A, the handle 20 can be offset in the packaging 10. For example, the distance from the handle 20 to the first lateral edge 21 can be substantially different than the distance from the handle 20 to the second lateral edge 31. The embodiments in FIGS. 1A and 1B can be combined; for example, the handle 20 can be above the third seal 13 while being offset, and the handle 20 can be within the third seal 20 while being centered.

Referring again to FIGS. 1A, 1B, 2 and 3, the packaging 10 comprises a reclosable seal 30 that is at least partially horizontally positioned. In an embodiment, the entirety of the reclosable seal 30 is horizontally positioned. Preferably the reclosable seal 30 is horizontally aligned with the third seal 13. In other words, the distance from the reclosable seal 30 up to the first seal 11 can be substantially the same as the distance from the third seal 13 up to the first seal 11, and the distance from the reclosable seal 30 down to the second seal 12 can be substantially the same as the distance from the third seal 13 down to the second seal 12.

In a preferred embodiment, the reclosable seal 30 extends only partially across the packaging 10, and the third seal 13 extends only partially across the packaging 10. For example, the third seal 13 can extend from the first lateral edge 21 of the packaging 10 to a point that is between the first lateral edge 21 and the second lateral edge 31, and the reclosable seal 30 can extend to the second lateral edge 31 from proximate to the endpoint of the third seal 13. In an embodiment, the sum of the length of the reclosable seal 30 and the length of the third seal 13 is at least 75% of the length of the first seal 11, preferably substantially the same as the length of the first seal 11. In an embodiment, the sum of the length of the reclosable seal 30 and the length of the third seal 13 is at least 75% of the length of the second seal 12, preferably substantially the same as the length of the second seal 12. In an embodiment, the reclosable seal 30 can abut the third seal 13.

The reclosable seal 30 can be any structure positioned on an opening to the interior of the packaging 10 to allow the opening to be reversibly opened and closed. For example, the reclosable seal 30 can comprise opposing surfaces that mate with each other to close the reclosable seal 30 and disconnect from each other to open the reclosable seal 30. In an embodiment, the opposing surfaces can be mated by being pushed together by the fingers of an individual and disconnected by the individual pulling the front or back panel of the packaging 10 away from the other panel. Alternatively or additionally, the opposing surfaces can be selectively mated and disconnected by a component that slides between the ends of the reclosable seal 30 (known to one of ordinary skill as a "slider"). However, the reclosable seal 30 is not limited to a specific embodiment. The opening that is reversibly opened and closed by the reclosable seal 30 can be a cut in the packaging 10, for example a laser score or a cut from scissors or another cutting tool as discussed in more detail later in this application.

As shown in FIG. 1A, the handle 20 can be horizontally aligned with the reclosable seal 30. As shown in FIG. 1B, the handle 20 can be positioned above the reclosable seal 30.

In an embodiment, the opening in the reclosable seal 30 is accessed by pulling one of the front and back panels of the packaging 10 away from the other panel to open a portion of the first seal 11. In an embodiment generally shown in FIGS. 2 and 3, the packaging 10 comprises a tearable section 32 that is configured to be separated from the packaging 10, for example by perforations or other weakened areas of the packaging 10, to provide access to the opening in the reclosable seal 30. Nevertheless, the packaging 10 is not limited to a specific means by which the opening in the reclosable seal 30 is accessed.

In an embodiment, the packaging 10 is made by pre-made bag converting machinery, for example machinery that processes a pre-made bag and comprises one or more of (i) a device that forms the handle 20, such as a laser device, a blade, a knife, or a punch and die assembly; (ii) a device that forms the opening, such as a laser device, a scissors, or another cutting tool; and (iii) an applicator that attaches the reclosable seal 30.

Figure 4:
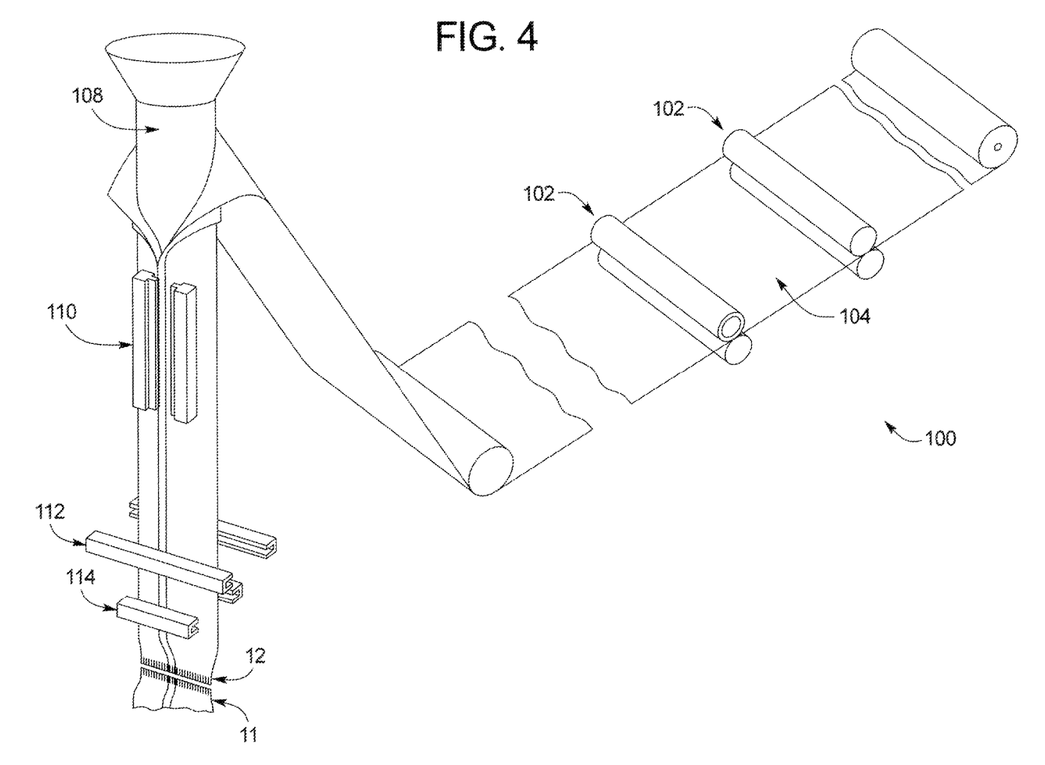
FIG. 4 shows a perspective view of an exemplary device that can make an embodiment of packaging provided by the present disclosure.
Figure 5:
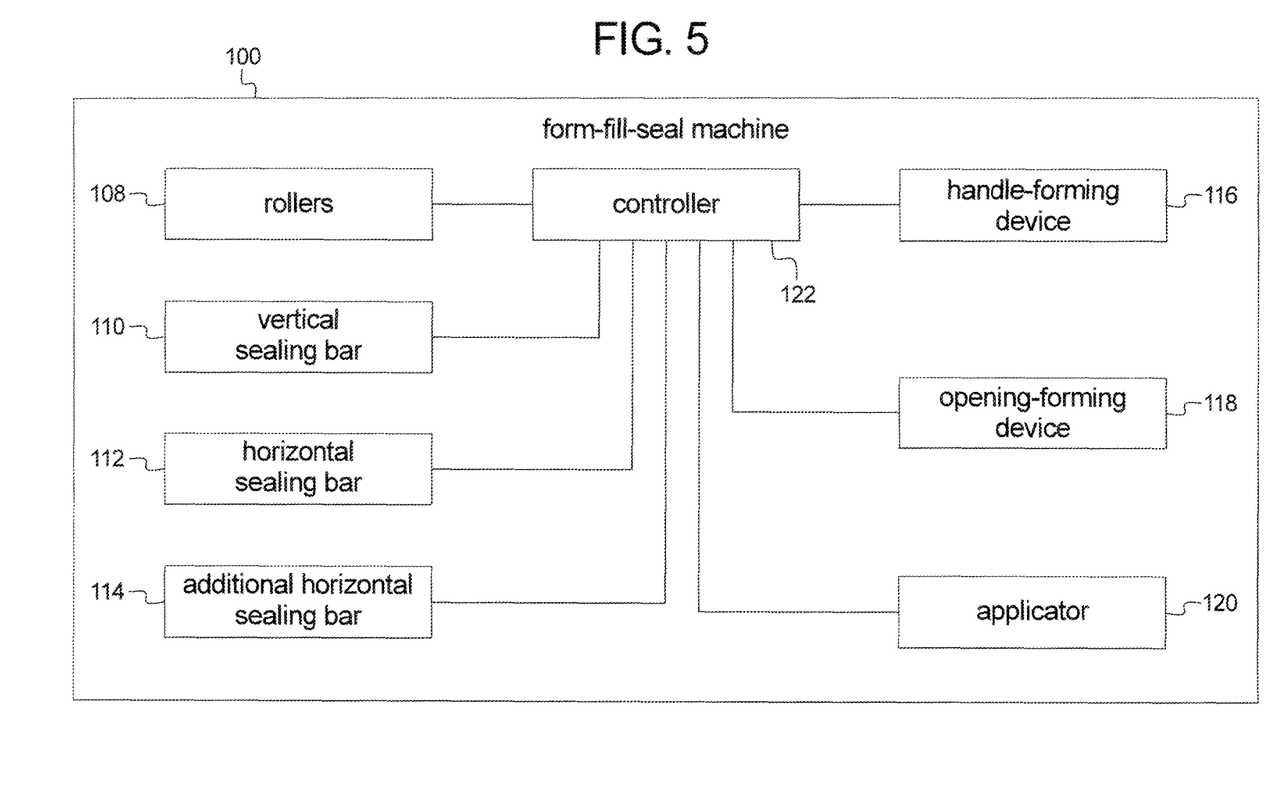
FIG. 5 shows a schematic diagram of an exemplary device that can make an embodiment of packaging provided by the present disclosure.

In another embodiment, the packaging 10 is a bag made using a form-fill-seal machine 100, an example of which is generally illustrated in FIGS. 4 and 5. The form-fill-seal machine 100 can comprise rollers 102 and/or another mechanism that convey a continuous flat roll of film 104 to a hollow forming tube 108 such that the film 104 is wrapped around the forming tube 108. The forming tube 108 can have a shape that is cylindrical, squared, rectangular, or any other suitable shape and can have straight corners, rounded corners, or corners of any shape. The forming tube 108 is not limited to a specific shape or specific corners, and the forming tube 108 can have any shape and any type of corners.

The film 104 is then pulled downward around the outside of the forming tube 108, and a vertical heat-sealing bar 110 clamps onto the opposite edges of the film 104 to bond the edges to each other by melting them together, forming one of the first and second lateral edges 21,31 of the packaging 10. Additionally or alternatively to the edge seal, the vertical seal can be a vertical seal at the back of the bag.

To start the bagging process, a horizontal sealing bar 112 clamps across the bottom edge of the forming tube 108, bonding the film 104 together to form the first seal 11 of the previous bag and the second seal 12 of the current bag. The product 50 is then dispensed into the bag through the forming tube 108. For example, the end of the bag comprising the second seal 12 can be lowered onto a weighing table, and when the gross weight of the product-filled bag is reached, filling can stop. The horizontal sealing bar 112 can seal the top of the bag to form the first seal 11, simultaneously forming the second seal 12 of the next bag above. The filled bag can then be trimmed from the film 104 to form the packaging 10.

An additional horizontal sealing bar 114 can form the third seal 13. Alternatively, the horizontal sealing bar 112 or a portion thereof can be configured to form the third seal 13. The third seal 13 is preferably formed after the bag is filled with the product 50. The third seal 13 can be formed before the first seal 11 is formed, after the first seal 11 is formed, or substantially simultaneously with formation of the first seal 11. If the third seal 13 is formed after the first seal 11 is formed, the third seal 13 is preferably formed before the filled bag is trimmed from the film 104. Nevertheless, the third seal 13 can be formed after the filled bag is trimmed from the film 104, for example at another location relative to the form-fill-seal machine 100.

The handle 20 can be formed in the third seal 13 at any time, preferably after the third seal 13 is formed. The present disclosure is not limited to a specific time at which the handle 20 is formed. In an embodiment, the handle 20 can be formed by a handle-forming device 116 device that punches through the packaging 10 into a die, cuts the packaging 10, applies a laser to the packaging, or otherwise creates the handle 20.

A cut that can form the opening of the packaging 10 that is reversibly closed and opened by the reclosable seal 30 can be applied at any time. The cut that forms the opening can be formed at one of the non-limiting exemplary times: (i) when the film is made, e.g. before the film is positioned on the initial roll, such as by a material supplier that provides the film with the laser score already therein for subsequent processing by the form-fill-seal machine 100; (ii) while the film is being formed into the packaging 10, e.g. when the film is being conveyed to the forming tube 108 or when the film is positioned on the forming tube 108; or (iii) after the packaging 10 is made from the film, e.g. after the second seal 12 has been formed, after the product has been dispensed into the packaging 10, after the first seal 11 has been formed, or after the third seal 13 has been formed. For example, the form-fill-seal machine 100 can comprise an opening-forming device 118, such as a device that comprises a laser, a scissors, or another cutting tool. An applicator 120 can attach the reclosable seal 30 to the packaging substantially simultaneously to formation of the opening or at any time after the opening has been formed. The present disclosure is not limited to a specific time at which the opening and the reclosable seal 30 are formed.

The form-fill-seal machine 100 preferably comprises a controller 122 configured to control the timing of one or more of (i) the rollers 102, (ii) the vertical sealing bar 110, (iii) the horizontal sealing bar 112, (iv) the additional horizontal sealing bar 114, (v) the handle-forming device 116, (vi) the opening-forming device 118 (if any), and (vii) the applicator 120. The controller 122 preferably synchronizes operation of these components of the form-fill-seal machine 100.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A packaging comprising:
   an interior comprising an upper end defined by a first seal and a lower end defined by a second seal;
   a third seal formed by heat sealing that is horizontally aligned with a reclosable seal, wherein the third seal and the reclosable seal are positioned below the first seal, and the third seal is vertically distanced from the first seal such that the first and third seals are separate seals from each other with a portion of the packaging therebetween;
   a handle that extends through the third seal, entirely confined within the third seal, entirely positioned below the portion of the packaging that is between the first seal and the third seal, offset from the reclosable seal, and horizontally aligned with the reclosable seal, wherein the handle comprises a cut in the packaging, wherein the cut is configured to allow an individual to extend four fingers though the handle with a thumb extending over the first seal to the other side of the packaging to thereby grasp the packaging, wherein the cut includes a slit with a shape that is a semi-circle or oval; and
   wherein the reclosable seal is positioned below the first seal, configured to reversibly open and close the interior, and horizontally positioned.

2. The packaging of claim 1 wherein the first, second and third seals are horizontal.

3. The packaging of claim 1 wherein the cut is a slit such that the packaging comprises a flap.

4. The packaging of claim 1 wherein:
   the packaging comprises a first lateral edge extending vertically from the first seal to the second seal and a second lateral edge extending vertically from the first seal to the second seal, the interior defined by the first seal, the second seal, the first lateral edge, and the second lateral edge; and
   the first seal extends from the first lateral edge to the second lateral edge to thereby extend an entire width of the packaging.

5. The packaging of claim 4 wherein the distance from the third seal up to the first seal is substantially the same as the distance from the reclosable seal up to the first seal.

6. The packaging of claim 4 wherein the distance from the third seal down to the second seal is substantially the same as the distance from the reclosable seal down to the second seal.

7. The packaging of claim 4 wherein the slit is curved such that a vertical distance from the slit to the first seal is greatest at a midpoint of the slit and decreases toward each opposite end of the slit.

8. The packaging of claim 1 wherein the packaging is a bag.

* * * * *